Patented June 19, 1945

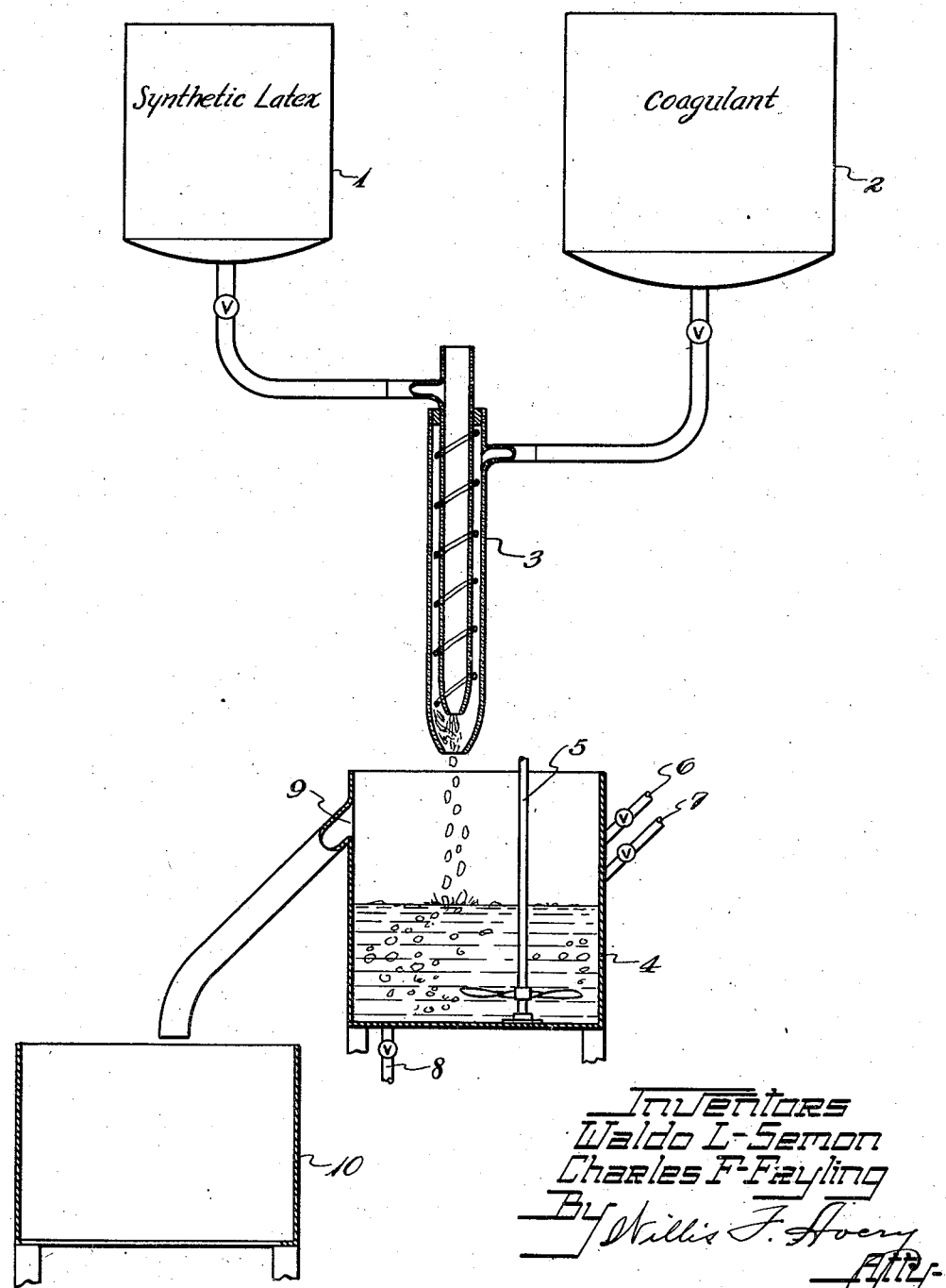

2,378,732

UNITED STATES PATENT OFFICE 2,378,732

PRODUCTION OF SYNTHETIC RUBBER

Waldo L. Semon and Charles F. Fryling, Silver Lake, Ohio, assignors to The B. F. Goodrich Company, New York, N. Y., a corporation of New York Application October 23, 1940, Serial No. 362,324

10 Claims. (Cl. 260—23)

This invention relates to a new type of synthetic rubber and to a process for preparing the same. More particularly this invention relates to a process of treating rubber-like polymers with a chemically reactive agent which converts the polymeric material to a less reactive stage, and to the stabilized synthetic rubber obtained by this process. Throughout the following description of the invention the term synthetic rubber will be used to refer to synthetic polymeric material which is obtained by the polymerization of a conjuated butadiene hydrocarbon such as butadiene-1,3 (commonly called butadiene), isoprene or 2,3 dimethyl butadiene-1,3 either alone or in admixture with other such butadiene hydrocarbons or with one or more other compounds, called comonomers, which are known to form rubber-like copolymers with butadiene hydrocarbons among which are acrylonitrile, styrene, methyl methacrylate, vinylidene chloride and the like.

It is known that raw snythetic rubber may be obtained by a process which involves the preparation of an aqueous emulsion containing a butadiene hydrocarbon and a comonomer, polymerization of the emulsion to a latex, and separation of the rubber from the latex by coagulation. It is also known that by including various catalytic agents, emulsifying agents and modifying agents in the emulsion to be polymerized, the speed of the polymerization may be increased and the quality of the product may be improved. These and other expedients in the process have, however, made it more difficult to produce a rubber of uniform quality which can be used in the large scale production of commercial articles such as automobile tires. As will be explained more fully below this difficulty arises principally from the great reactivity of the synthetic rubber both while in latex form and after coagulation.

This invention has as its principal object the production of a synthetic rubber which is free from the reactivity and instability of rubber produced by previously known processes. Another object is to provide a method of treating synthetic rubber which will insure the obtainment of a product of uniform quality which will not be subject to great variations in properties resulting from relatively slight changes in technique. Still another object is to provide a synthetic rubber, and a method for preparing the same, which is substantially free of foreign substances which act to increase the instability of the rubber and the difficulty of using the rubber in the production of vulcanized articles. The manner in which this invention accomplishes these and other objects will be aparent from the following description.

In accordance with this invention crude synthetic rubber of remarkable stability is prepared by a process which in a preferred embodiment involves the polymerization of butadiene and a comonomer in aqueous emulsion, coagulation of the resulting latex, immediately treating the rubber with a chemically reactive stabilizing solution, and finally washing and drying the rubber. This process can be modified in many ways as by changing the character of certain of the steps or the addition of other steps but the outstandingly high stability of the rubber to ordinarily deleterious influences like heat, light and oxygen is always attained by the treatment with the chemically reactive solution.

The nature of the chemically reactive stabilizing solution which is used in this invention will depend largely upon the previous history of the synthetic rubber, that is upon the nature of the rubber itself, upon the catalysts, emulsifying agent and other ingredients which were used in preparing the aqueous emulsion, upon the nature of ingredients added to the latex, if any, after polymerization, and upon the method used to coagulate the latex. In general it will be desirable to employ an alkaline solution having a pH greater than seven such as an aqueous solution of an organic or inorganic base or an inorganic salt which hydrolyzes to give an alkaline reaction or an alkali metal salt of a water soluble organic acid. Typical reactive solutions which can be used to treat butadiene copolymers include, for example, sodium hydroxide, sodium carbonate, sodium sulfide, sodium hydrosulfide, sodium sulfite, sodium thiosulfate, sodium cyanide, sodium thiocyanate, sodium silicate, sodium phosphate, sodium acetate, sodium dithio carbamate and the like as well as the corresponding ammonium and potassium compounds.

In order fully to appreciate the import of this invention and the methods of carrying out the same it is necessary to consider in greater detail the polymerization process which leads to the production of synthetic latex and the methods of obtaining the rubber from the latex. The first step in the process is the preparation of an aqueous emulsion containing polymerizable ingredients which include one or more butadiene hydrocarbons and one or more comonomers. Satisfactory monomer mixtures for the production of synthetic rubber are, for example, 70 parts butadiene, 25 parts acrylonitrile and 5 parts styrene;

55 parts butadiene and 45 parts acrylonitrile; 70 parts butadiene and 30 parts styrene; and 70 parts butadiene and 30 parts methyl methacrylate. The monomer mixture is emulsified in water by means of a suitable emulsifying agent such as a soap or a soap-like material. Such emulsifying agents as sodium myristate, sodium palmitate, sodium oleate, sodium naphthalene sulfonate and sodium lauryl sulfate are ordinarily used. Also included in the emulsion are one or more catalytic agents which initiate or accelerate the polymerization reaction. Hydrogen peroxide and other peroxides are typical catalysts while in many cases catalyst activators such as sodium pyrophosphate, sodium oxalate, urea, glycine or other amino acids and myristic or other free fatty acids are used in connection with the peroxide catalyst. The emulsion also may contain compounds which act to prevent cross linking of the polymer chains during polymerization. One such compound is di-isopropyl di-xanthageno disulfide while many other compounds may be added for a similar purpose. Other ingredients of the aqueous emulsion may include electrolytes or buffer salts to regulate the pH during polymerization.

The aqueous emulsion containing these various ingredients is allowed to polymerize by agitation at a suitable temperature until a latex containing polymerized rubber-like particles dispersed in an aqueous medium is formed. The latex may then be treated in several different ways before coagulation, if desired. Thus, it may be subjected to a controlled oxidation process to improve its properties, or it may be compounded with age resistors, softening agents, vulcanizing ingredients, pigments and the like. Coagulation of the latex may then be carried out in any one of a variety of ways such as by the addition of acid, alcohol, or salt or by a combination of these methods.

From a consideration of the complexity of this process with its many variables, the difficulty of producing a product of uniform quality under large scale production conditions can readily be appreciated by those skilled in the art. While some samples which are produced by immediately coagulating the latex exhibit good properties and yield vulcanizates of sufficient value for commercial use, other samples prepared and treated in substantially the same manner are deteriorated badly and consequently only inferior vulcanizates may be prepared therefrom.

This lack of uniformity in the quality of synthetic rubber may be traced to what may be called the inherent reactivity of the rubber as produced by this process. Although the factors which bring about this reactivity are not understood in all cases, it is probable that the reactivity arises both from the nature of the rubber itself and also from the presence of materials in the rubber which are not in themselves of a rubber-like character. It is believed that the synthetic rubber molecule of the copolymer type is composed of long chains of butadiene units and comonomer units. These polymer chains may contain certain reactive centers such as double linkages or other chemically reactive structures where oxidation, hydrolysis or some other chemical reaction may readily occur. Moreover, there may be a tendency for the polymer chains to link together, split apart or otherwise rearrange.

Another factor which contributes to the reactivity of synthetic rubber and to the difficulty experienced in obtaining satisfactory vulcanizates therefrom is a result of the method of manufacture and pertains to the presence of undesirable non rubber-like materials in the rubber after coagulation. The catalyst used in the polymerization process, or some substance present to activate catalytic action, or the decomposition products of either of these may still be present in the coagulated polymer. This is also true of the emulsifying agent, modifying agent and other materials which were present during the emulsion polymerization. Furthermore, the method of coagulation may influence the reactivity of the rubber by occluding these foreign materials with the rubber during aggregation of the dispersed globules. Chemical methods of coagulation such as by use of dilute acid while very efficient in coagulating the latex may convert the emulsifying agent to an insoluble substance which is occluded in the coagulum and may also interfere with the quality of the rubber by the change in pH.

According to this invention the reactivity of synthetic rubber is substantially alleviated by treating the rubber after coagulation with a chemically reactive solution, preferably an alkaline solution such as sodium hydroxide. This treatment may be applied to synthetic rubber produced by any of the various modifications in the polymerization and coagulation processes mentioned above. It is particularly applicable to rubber produced by the emulsion polymerization of a mixture of butadiene and a comonomer in the presence of soap followed by coagulation of the latex with an acid.

The manner in which the chemically reactive solutions of this invention act on the rubber to reduce its activity is related to the causes for reactivity discussed hereinabove. It is believed that this treatment brings about stability in the rubber both by reacting with the reactive centers present in the structure of the rubber molecule and thus destroy their reactivity and by removing undesirable non rubber-like constituents of the rubber such as catalyst or emulsifying agent.

The method of carrying out this invention may be varied considerably to conform to the methods employed in treating and coagulating the latex and to subsequent processing operations. It is usually desirable to add an age-resistor such as phenyl beta naphthylamine to the latex before coagulation. Other substances which coact with the age-resistor to improve the color stability of the polymer or which serve as plasticizing agents for the rubber are also sometimes added to the latex before coagulation. In this event the stabilizing solution used to treat the coagulated rubber will be one which does not interfere with nor remove these added substances. The protective action of phenyl beta naphthylamine and similar age-resistors is not destroyed but rather is enhanced by treatment of the coagulated rubber with alkaline solutions. Treatment with sodium cyanide or sodium dithiocarbamate solutions particularly enhance the action of the age-resistor by improving the color stability of the polymer.

Coagulation of the latex and the recovery of the synthetic rubber may be accomplished by any desired procedure such as by directly adding the coagulant to the latex in a batch operation and then filtering off the rubber in form of a solid cake or crumbs, or by continuously feeding streams of coagulant and latex into a continuous coagulating machine, continuously expressing the liquid from the coagulum and recovering the coagulum as a continuous sheet. It is preferred, however, to coagulate the latex by a method which produces a coagulum of fine particle size since subsequent treatment with the stabilizing solution is thereby facilitated. This may be accomplished by a method of coagulation such as that described in a copending application of Waldo L. Semon, Serial No. 367,821, filed Nov. 27, 1940.

The coagulant may be an acid or acidic material, a salt solution, an alcohol, or a solution made up of a mixture of these. Thus, the coagulant may be formic, acetic, propionic, oxalic, citric, tannic, hydrochloric, sulfuric, phosphoric or other acids, sodium chloride, sodium bisulfate or other salt solution or ethyl, propyl or butyl alcohol or a combination of any of these, but it is preferred to use the simple organic acids such as formic or acetic or the inexpensive mineral acids such as sulfuric. The concentration of the coagulating solution and the amount to be used will obviously depend upon the nature of the latex but in general a sulfuric acid of about 0.1 to 2% strength in sufficient quantity to bring the latex to a pH of about 3.0 to 5.5 is satisfactory. The latex may be used as it is obtained from the emulsion polymerization process or may be diluted to any desired concentration before coagulating.

After coagulation, it is preferable to bring the synthetic rubber into contact with the stabilizing solution as quickly as is conveniently possible. As has already been suggested, if coagulation is effected in the manner described in the above mentioned copending application of Waldo L. Semon, it is possible to allow the coagulated particles to drop directly into the stabilizing solution. This removes the tendency of the particles to stick together or to flocculate and enables the particles to be maintained in their original coagulated form, thereby insuring small particle size and efficient contact with the stabilizing solution. If the rubber is coagulated by other means, however, it may first be filtered or otherwise separated from the liquid constituents of the latex, and then added to the stabilizing solution. Treatment of the rubber with the stabilizing solution may consist in simply allowing the rubber to remain in contact with the solution for a time sufficient to destroy the reactivity of the material, but it is preferred to agitate the mixture during the treatment and to carry out the operation at a temperature above room temperature but below the temperature of boiling water. Several extractions or treatments of the rubber with one or more stabilizing solutions at different temperature and concentration may be carried out if desired.

If the latex used in preparing the synthetic rubber contains a fatty acid soap or some other material which during acid coagulation is converted into an insoluble substance, it will be desirable to use a relatively strong alkaline solution both to reconvert the insoluble material into soluble material and to neutralize the acid present from coagulation. In general an alkaline solution of pH greater than about 9 or 10 works best under these conditions. The concentration of the alkaline stabilizing solution may in other cases be varied over a wide range, concentrations of from about 2 to 50% of the base or salt in water being effective.

After treatment of the rubber with the stabilizing solution it is desirable to wash the rubber with water until the wash water is approximately neutral. If a strongly alkaline solution is used in the treatment this may require several washings. In instances where soap may be present softened water obviously is preferred. The crude synthetic rubber from this treatment and washing may be sheeted or allowed to remain in the form of crumbs or cakes, and then dried. Alternatively, it may be washed and sheeted on a wash mill. Drying may occur in any of the conventional type driers used in the rubber industry such as a vacuum drier or a forced air drier. The crude rubber prepared in this manner is exceedingly stable and of uniform quality. It may be processed, compounded and vulcanized in the manner which is customary with natural rubber.

As a specific example of one embodiment of the invention a synthetic latex may be prepared by emulsion polymerization and this latex worked up into crude synthetic rubber of high stability in an apparatus such as that shown diagrammatically in the accompanying drawing. The synthetic latex is prepared by the polymerization of an aqueous emulsion containing the following:

| | Parts by weight |
|---|---|
| Butadiene | 94 |
| Acrylonitrile | 76 |
| Hydrogen peroxide | .5 |
| Myristic acid | 6.8 |
| Sodium hydroxide | 1 |
| Water (distilled) | 400 |

Polymerization is carried out by polymerizing the above emulsion in a stainless steel polymerizer for 36 hours at a temperature of 28–31° C., the emulsion being agitated continuously during the process. The contents of the polymerizer are emptied into a tank, 1, and the polymerizer rinsed with 80 parts of softened water and this rinse also added to tank 1. An age-resistor emulsion containing 5 parts of phenyl beta naphthylamine and 1 part of myristic acid dissolved in 15 parts of benzene, which is emulsified with 0.5 part of concentrated ammonia and 41 parts of water, is also added to the latex in tank 1, and the latex allowed to stand for 6 hours. The latex in tank 1 is then diluted with 50% of its volume of softened water. Latex from tank 1 and a 0.6% sulfuric acid solution contained in tank 2 are then allowed to flow simultaneously through a coagulating nozzle 3, at such a rate that the latex is completely coagulated. This is accomplished by regulating the rate of flow of liquid from the tanks, the diameter of the tubes of the coagulating nozzle and the distance the outer tube projects over the inner tube. Small particles of coagulum are discharged from the coagulating nozzle 3, and fall a distance of about two feet into a treating tank 4, which is equipped with means for mechanical agitation 5 and which contains a dilute sodium hydroxide solution at a pH of about 12 and at a temperature of 40° C. During the coagulation of the latex care is observed that the pH of the solution in the tank does not fall below 9 or 10, more sodium hydroxide solution being added through pipe 6, and water through pipe 7 if necessary. After a charge of latex is coagulated the extraction of the particles in tank 4 is continued at a temperature of about 40° C. for about one hour. The stirrer is then stopped, the rubber particles allowed to float to the top of the solution, and the mother liquor withdrawn through pipe 8. Another charge of sodium hydroxide solution is introduced through pipe 6 and the extraction procedure repeated at 45–50° for about two more hours. The liquor from this extraction is again expelled, water is introduced through pipe 7 and the extraction procedure repeated. Washings are continued until the liquor is approximately neutral. Water is then added to the tank until the level is up to the trough 8, and the rubber particles are discharged through trough 9 to a filter box 10. The rubber-like crumbs are allowed to drain in the filter box and are then removed, sheeted and dried in any desired manner.

The dry synthetic rubber is light colored and translucent and will not deteriorate upon standing in air or in light. It breaks down rapidly when masticated and can be handled in the rubber factory in the usual way without observing any special precautions. After being compounded and vulcanized, vulcanizates of excellent properties are obtained. The rubber contains less than 0.5% of fatty acid which does not interfere with curing while rubber prepared in a similar way which is not extracted with an alkaline solution contains enough fatty acid to cause blooming in cured articles.

In another example synthetic rubber prepared as above is treated with a sodium hydroxide solution and then with a sodium cyanide solution. Tests on the vulcanized articles indicate that the additional treatment with the sodium cyanide solution raises the tensile strength and the ultimate elongation of the vulcanizates. A similar treatment with a sodium dithiocarbamate solution lessens the tendency of the synthetic rubber to become colorized upon exposure to light.

It is apparent that many modifications may be made in the above procedure without departing from the spirit and scope of the invention as defined in the appended claims.

We claim:

1. The method of producing synthetic rubber which comprises polymerizing a conjugated butadiene hydrocarbon in an aqueous emulsion containing soap, coagulating the resulting latex with an acid and treating the coagulated synthetic rubber with an aqueous solution of an alkali having a pH greater than ten.

2. The method of producing synthetic rubber which comprises polymerizing a mixture of butadiene and acrylonitrile in an aqueous emulsion containing soap, coagulating the resulting latex with an acid and extracting the coagulated synthetic rubber with an aqueous solution of sodium hydroxide.

3. The method of producing synthetic rubber which comprises polymerizing a mixture of butadiene and acrylonitrile in an aqueous emulsion containing a fatty acid soap, coagulating the resulting latex with dilute sulfuric acid and extracting the coagulated synthetic rubber with an aqueous solution of sodium hydroxide.

4. The method of producing synthetic rubber which comprises polymerizing a mixture of butadiene and styrene in an aqueous emulsion containing soap, coagulating the resulting latex with an acid and immediately treating the coagulated synthetic rubber with an aqueous solution of an alkali.

5. The method of producing synthetic rubber which comprises polymerizing a conjugated butadiene hydrocarbon in aqueous emulsion to form a synthetic latex, coagulating the latex in a manner which produces relatively small particles of synthetic rubber, immediately treating the coagulated particles with an aqueous solution of an alkali and thereafter washing and drying said particles.

6. The method of producing synthetic rubber which comprises polymerizing a mixture of butadiene and acrylonitrile in an aqueous emulsion containing soap to form a synthetic latex, bringing streams of the latex and a liquid coagulant therefor into coagulating relation whereby small discontinuous particles of coagulum are formed, allowing the coagulated particles to drop into an aqueous solution of an alkali, exhaustively extracting said particles with said solution and thereafter washing and drying said particles.

7. The method of producing synthetic rubber which comprises polymerizing a mixture of butadiene and styrene in an aqueous emulsion containing soap to form a synthetic latex, bringing streams of the latex and a liquid acidic coagulant therefor into coagulating relation whereby small discontinuous particles of coagulum are formed, allowing the coagulated particles to drop into an aqueous solution of an alkali having a pH greater than ten, exhaustively extracting said particles with said solution and thereafter washing and drying said particles.

8. A stabilized synthetic rubber prepared by coagulating with an acid a synthetic latex obtained by the polymerization of a conjugated butadiene hydrocarbon in an aqueous emulsion containing soap and immediately treating the coagulum with an aqueous solution of an alkali.

9. A stabilized synthetic rubber prepared by coagulating with an acid a synthetic latex obtained by the polymerization of butadiene and acrylonitrile in an aqueous emulsion containing soap, and immediately treating the coagulum with an aqueous solution of an alkali.

10. A stabilized synthetic rubber prepared by coagulating with an acid a synthetic latex prepared by the polymerization of a mixture of butadiene and styrene in an aqueous emulsion containing soap, and immediately treaing the coagulum with an aqueous solution of an alkali.

WALDO L. SEMON.
CHARLES F. FRYLING.